United States Patent Office 3,031,465
Patented Apr. 24, 1962

3,031,465
NEW BASIC COMPOUNDS OF THE DIHYDROFURAN SERIES
Rolf Denss, Basel, Emil Girod, Riehen, near Basel, and Franz Häfliger, Basel, Switzerland, assignors to Geigy Chemical Corporation, Ardsley, N.Y., a corporation of Delaware
No Drawing. Filed July 8, 1959, Ser. No. 825,646
Claims priority, application Switzerland Aug. 15, 1958
6 Claims. (Cl. 260—347.7)

The present invention concerns new basic compounds of the dihydrofuran series, namely 2-methyl-3-hydroxy-5-dimethyl-aminomethyl-2.3-dihydro-furan as well as the methahalides derived therefrom corresponding to the two formulae

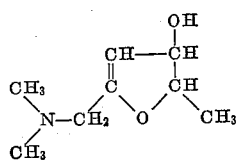

and

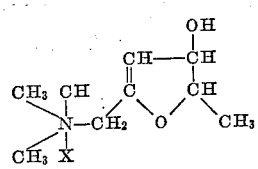

wherein X represents a halogen ion.

It has been found that the compound of the formula Ia can be produced by reducing 2-methyl-3-oxo-5-dimethylaminomethyl-2.3-dihydro-furan of the formula

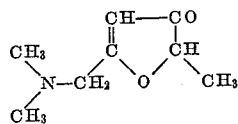

with an alkali metal-earth metal hydride, in particular with an alkali metal borhydride.

It has also been found that this tertiary base and, in particular the methohalides of the formula Ib obtained therefrom by reaction with methyl halides, possess valuable neurophysiological properties.

In contrast to Muscarin, a 2-methyl-3-hydroxy-5-trimethylammoniomethyl tetrahydrofuran of a specific configuration, the corresponding 2.3-dihydrofuran derivatives of the formula Ib not only have a peripheral cholinergic action but also cause nicotinic stimulation on the peripheral ganglia. This can be shown, for example, on the dog's bladder, on which the 2.3- dihydrofuran derivatives according to the invention produce a contraction which cannot be antagonised by atropine. In addition, in contrast to Muscarin, they also act on the neuromuscular synapses in the rectus muscle of the frog, a further, experimental means to demonstrate nicotinic action. Therapeutic utilisations of the above described pharmacological properties are, e.g. the treatment by intravenous injection of postoperative intestinal tract paresis and urinary bladder atony.

The starting material of the formula II is obtained from acetoacetic acid esters by condensing them with sugars to form 2-methyl-5-polyhydroxyalkyl furan-3-carboxylic acid esters, breaking down the polyhydroxyalkyl group to the formyl group with lead tetra-acetate, reacting the 2-methyl-5-formyl furan-3-carboxylic acid esters obtained with dimethyl formamide according to Leuckart in formic acid to form 2-methyl-5-dimethylaminomethyl furan-3-carboxylic acid esters, converting these by way of the hydrazide into the azide and decomposing the latter by heating with aqueous mineral acids.

Sodium borhydride or potassium borhydride in water or in methanol for example can be used as reducing agents. The crude reduction products can be purified and the two stereoisomers so formed can be separated, for example, by adsorption chromatography.

Hydrochloric acid, hydrobromic acid, sulphuric acid, phosphoric acid, acetic acid, tartaric acid, citric acid and ethane disulphonic acid for example can be used for the formation of salts with the tertiary base obtained by reduction. Suitable methyl halides for the quaternisation of the tertiary base are methyl iodide, methyl bromide and methyl chloride. However, the methochloride for example can also be produced by reacting the metho-iodide obtained by quaternisation with methyl iodide with a silver choride suspension.

The following example illustrates the production of the new compounds. This example, however, is only illustrative but not limitative with regard to reaction conditions, reactants, solvents, etc. The temperatures are in degrees centigrade.

*Example*

20 g. of 2-methyl-3-oxo-5-dimethylaminomethyl-2.3-dihydrofuran are dissolved in 50 ccm. of water and the solution is added dropwise within 90 minutes at 40–50° while stirring to a solution of 20 g. of sodium borhydride in 150 ccm. of water. The reaction mixture is stirred for another 15 minutes at the same temperature, cooled and then continuously extracted with ether for 15 hours. The ethereal solution is then dried with sodium sulphate, filtered and concentrated. The residue, a pale yellow oil, distils at 55–66° under 0.005 mm. pressure.

12.3 g. of the crude reduction product so obtained are dissolved in 12 ccm. of benzene and the solution is adsorbed on a column prepared in benzene from 1200 g. of aluminium oxide of activity grade III–IV (aluminium oxide Woelm, activity grade I, deactivated by shaking with 10% by weight of water). Benzene with 10% by volume of ether elutes first epi-normuscarine and then allo-normuscarine. Benzene with 20% by volume of ether and finally ether elute first cis-2-methyl-3-hydroxy-5-dimethylaminomethyl-2.3-dihydrofuran, then its stereoisomer trans 2-methyl-3-hydroxy-5-dimethylaminomethyl-2.3-dihydrofuran and, finally, normuscarine. After the elution of the normuscarine, epi-allo normuscarine is obtained, possibly with the addition of 5% by volume of methanol to the ether.

Generally, the two stereoisomeric 2-methyl-3-hydroxy-5-dimethyl furans can be separated from each other and from the corresponding tetrahydrofuran derivatives by eluting with benzene to which increasing amounts of ether are added. A sufficient separation of the components of the crude product can be attained by well adjusting the activity of aluminium oxide, the ether content of the benzene and the rapidity with which the solvent passes through. However, the chromatographic conditions can also be more or less standardised and then, if necessary, followed by a second chromatogram using chosen fractions.

The individual fractions are identified by infra-red spectrography. The I—R spectrum of the cis compound shows a strong C=C stretching vibration at 6.03 $\mu$ (in about 5% $CCl_4$ solution). The maximum at 10.30 $\mu$ is suitable for differentiating it from the trans compound. The trans compound shows the C=C stretching vibration at 6.02 $\mu$ and can be easily differentiated by the maximum at 12.00 $\mu$ from the cis compound.

The fractions of identical steric composition are combined and distilled in a high vacuum. Both stereoisomers boil in a bulb tube at 100–110° bath temperature under 0.001 mm. pressure.

To produce the metho-iodide of the cis 2-methyl-3-hydroxy - 5 - dimethylaminomethyl-2.3-dihydro-furan, for example 2 g. of the above distillate of the cis fractions are dissolved in 50 ccm. of acetone and, while cooling with ice and shaking, 2 ccm. of methyl iodide are added. The quaternary salt soon crystallises out. It is filtered off under suction, after standing for a considerable time in the refrigerator, and washed with acetone. If purification is necessary, for example 2.5 g. of the crude metho-iodide are dissolved in 10 ccm. of methanol, 100 ccm. of acetone are added and the solution is concentrated, possibly after again adding acetone, until the metho-iodide starts to crystallise. The whole is then allowed to cool and, after standing for some time in the refrigerator, the purified metho-iodide is filtered off under suction, washed with acetone and dried, whereupon it melts at 146–147°. Its I—R spectrum (in potassium bromide) shows an OH stretching vibration at 2.99 μ and a C=C stretching vibration at 6.06 μ. Strong bands, which do not appear in the spectrum of the trans isomer, occur at 10.29, 8.51, 9.49, 12.40 and 7.83 μ.

On shaking the cis metho-iodide with freshly precipitated silver chloride in alcoholic solution, the cis methochloride is obtained which, after recrystallisation from isopropanol/acetone, melts at 159–160°.

In an analogous manner, the metho-iodide of trans 2-methyl-3-hydroxy-5-dimethylaminomethyl-2.3 - dihydrofuran is obtained from the above distillate of the tertiary trans base (M.P. 140–141° from methanol/acetone). In the I—R spectrum in potassium bromide it shows an OH stretching vibration at 3.04 μ and a C=C stretching vibration at 6.06 μ. Strong bands, which do not occur in the spectrum of the cis isomer, occur at 9.86, 8.45, 9.72, 12.00 and 12.65 μ.

The mixture of the metho-iodides of the cis and trans 2-methyl-3-hydroxy-5-dimethylaminomethyl - 2.3 - dihydro-furan melts at 120–125°.

What we claim is:

1. New basic compounds of the dihydrofuran series of the formula

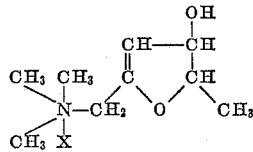

wherein X represents a halogen ion.

2. 2 - methyl - 3 - hydroxy-5-dimethylaminomethyl-2.3-dihydrofuran metho-iodide.

3. 2 - methyl - 3 - hydroxy-5-dimethylaminomethyl-2.3 dihydrofuran methochloride.

4. Cis 2 - methyl-3-hydroxy-5-dimethylaminomethyl-2.3-dihydrofuran metho-iodide.

5. Trans 2-methyl-3-hydroxy-5-dimethylaminomethyl-2.3-dihydrofuran metho-iodide.

6. Cis 2-methyl-3-hydroxy-5-dimethylaminomethyl-2.3-dihydrofuran methochloride.

References Cited in the file of this patent

Corrodi et al., Experientia, vol. 13, (1957), pp. 138–9.